March 8, 1927.

C. S. BRAGG ET AL

POWER ACTUATOR

Filed Aug. 14, 1926

INVENTORS
Caleb S. Bragg
Victor W. Kliesrath
BY Louis Revoo Whitaker
ATTORNEY

March 8, 1927.
C. S. BRAGG ET AL
1,620,513
POWER ACTUATOR
Filed Aug. 14, 1926
2 Sheets-Sheet 2
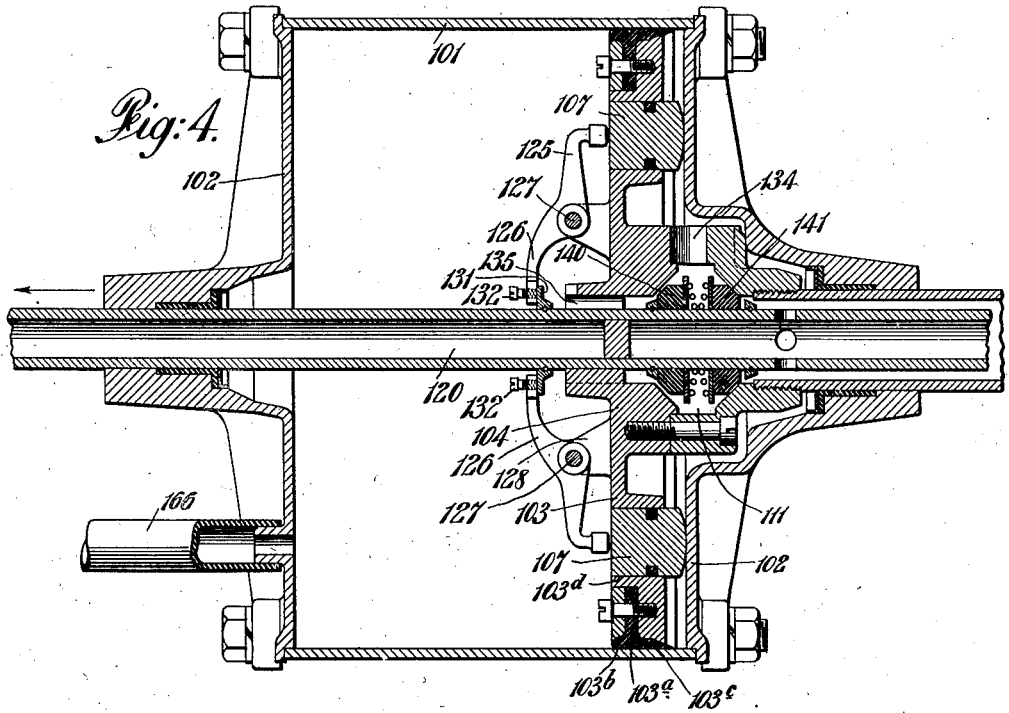
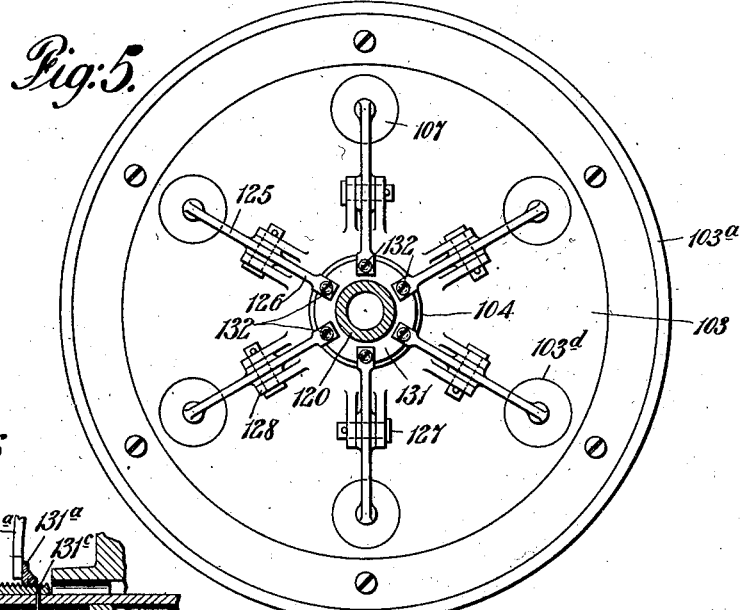
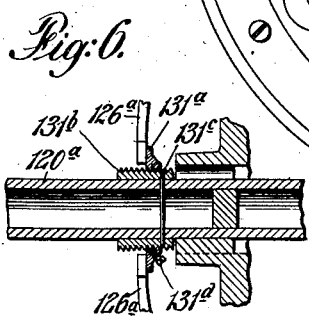

Patented Mar. 8, 1927.

1,620,513

UNITED STATES PATENT OFFICE.

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK.

POWER ACTUATOR.

Application filed August 14, 1926. Serial No. 129,174.

Our invention consists in the novel features hereinafter described, reference being had to the accompanying drawings, which illustrate one embodiment of the same, and a slight modification thereof, selected by us for purposes of illustration, and the said invention is fully disclosed in the following description and claims.

Our invention is an improved power actuator for use in connection with automotive vehicles, and especially adapted for operating the brake mechanism thereof, in which the piston of the actuator is provided with fluid pressure operated portions movable with respect to the piston under the action of the differential pressures to which the piston is subjected, the said movable portions of the piston being operatively connected with the operator operated part, and preferably with the valve mechanism which controls the actuator. The object of the invention is to enable the operator to determine, by the increased resistance to the operator operated part, as for example by the increased pressure against his foot, where the pedal lever is employed to actuate the valve mechanism of the actuator, how much pressure the piston is exerting on the brakes or other part to be actuated. According to our invention, the operator carries a certain percentage of the piston load on the operator operated part in contact with his foot (if a pedal lever is employed) and this pressure increases as the pressure exerted on the piston and the brake mechanism connected therewith increases. In addition to this feature, our invention also automatically effects the reversing of the controlling valve mechanism, or its return to neutral position, without employing a retracting spring of greater strength than would be required to counterbalance the weight of the brake pedal.

In the accompanying drawings, which illustrate one form in which we have contemplated embodying our invention, and a modification thereof—

Fig. 4 is a sectional view similar to Fig. 2, showing a modified form of piston.

Fig. 5 is a plan view similar to Fig. 3, showing the piston illustrated in Fig. 4.

Fig. 6 is a detail sectional view of a portion of the apparatus illustrating a slight modification thereof.

Figure 1:
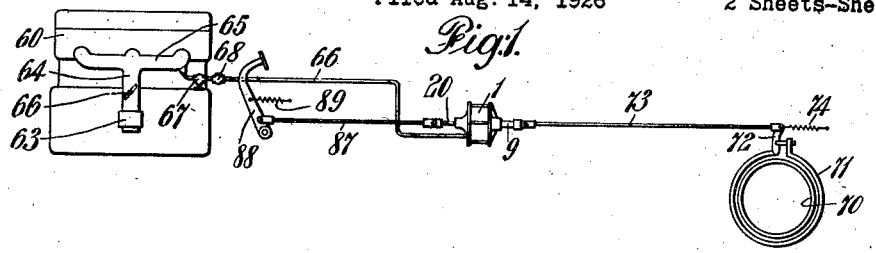
Fig. 1 represents, diagrammatically, an installation in an automotive vehicle of our improved actuator operatively connected with brake mechanism thereof, and operated by suction obtained from the intake manifold of the internal combustion engine, and atmospheric pressure.

In Fig. 1, which diagrammatically represents our invention installed in an automotive vehicle, 60, represents the internal combustion engine for operating the vehicle, provided with the usual carburetor, 63, connected with a suction passage, 64, terminating in the usual intake manifold, 65, and provided with the usual throttle valve, 66, between the carburetor and the manifold. 1, represents the cylinder of our improved power actuator. In this instance the cylinder is closed at each end by heads, 2. In the form of our invention illustrated in Figs. 2 and 3, the piston is provided with apertures closed by yielding diaphgram portions, and is most conveniently formed by providing a single diaphragm extending over all of the apertures in the piston, which single diaphragm may also conveniently provide the necessary gaskets for the piston, if made of suitable material. In the present instance, the piston is in the form of a spider, 3, and comprises the hub portion formed of two parts, 4 and 4$^a$, adapted to be clamped together, radial webs or arms, 5, formed integrally with or secured to the hub portion, 4, and peripheral portions, 6 and 6$^a$, of which the portion, 6, is rigidly connected with the hub portion, 4, by the radial webs or arms, 5, and may be and is preferably formed integrally therewith, the peripheral portion, 6$^a$, being a clamping ring secured to the other portions of the piston in any desired manner. 7 represents a diaphragm member composed preferably of rubber with or without a reinforcing fabric, although it may be composed of sheet metal, or other suitable material. This diaphragm member has a central aperture fitting over a shouldered portion of the hub member, 4, and the outer edges of the diaphragm members extending between the peripheral portions, 6 and 6$^a$, of the piston, and are shown provided with oppositely extending flanges indicated at 7ª and 7ᵇ, forming the gaskets for the piston, which are conveniently formed in one piece with the diaphragm member, when the diaphragm is formed of rubber or other suitable material. The diaphragm member may also be made thicker adjacent to the hub and adjacent to the flanges, than in the portions which extend over the apertures in the piston between the radial webs or arms, 5, and it is so shown in the drawing. In assembling the parts of the piston, the diaphragm member is placed over the shouldered portion of the hub member, 4, and the adjacent portions are clamped between said hub member, 4, and the clamping member, 4ª, of the hub, said hub members being secured together in any desired manner, as by bolts, 8.

The outer portions of the diaphragm member will also be clamped between the peripheral portions, 6, and the clamping ring, 6ª, which is secured to the piston in any desired manner, as by bolts, 8ª. The flanges or gasket portions, 7ª, 7ᵇ, are of such thickness that when the piston is inserted in the cylinder, they will serve as gaskets in the usual manner.

It will be seen that the diaphragm member provides flexible diaphragm portions between the hub portions and the peripheral portions of the piston extending across the apertures in the piston between the radial webs or arms, 5, thereof. The radial arms or webs, 5, may be curved or bent away from the plane of the diaphragm member, if desired, to give greater freedom of movement to the diaphragm member. The hub of the piston is provided with controlling valve mechanism for the actuator, comprising in this instance a valve chamber, 11, connected by a port, or ports, 35, with the cylinder, forward of the piston, said valve chamber being provided with oppositely disposed conical valve seats, 13 and 14, which are engaged by a pair of oppositely disposed valves, 40 and 41, preferably formed of molded rubber and supported on a valve actuating part, or sleeve, 20, fitting the central apertures of the valves, so as to form an air-tight connection. Said valves are normally held seated by yielding means, indicated at 50, interposed between them, and the sleeve, 20, is provided with collars, 40ª, 41ª, respectively, on opposite sides of the valves, so that the movement of the sleeve or piston longitudinally with respect to each other, in either direction will effect an opening of one only of said valves. Valve 40, we term the suction valve, and valve, 41, the air inlet valve. The aperture controlled by the air inlet valve, 41, communicates with the atmosphere. In this instance the piston is shown provided with a hollow piston rod, 9, provided at its outer end with a cap 10, having a lug, 10ª, for conveniently attaching it to the brake mechanism, the said lug being provided with an air inlet aperture, 10ᵇ, communicating with the interior of the piston and with the interior of the sleeve, 20. In this instance the sleeve is provided with an interior plug, 21, in rear of which (to the right in Fig. 2), it is also provided with ports, or apertures, 22, to assist in admitting air to the aperture controlled by the valve, 41, when the latter is opened. The piston rod, 9, extends through a suitable stuffing box in one head of the cylinder, and the sleeve 20 extends through the other head of the cylinder, in this instance, through a stuffing box provided therein. The outer end of the sleeve, 20, is conveniently provided with a fitting 23, having a lug, 24, for attaching it to an operating part.

The particular valve mechanism herein shown and described forms no part of our present invention, it being substantially like that shown in our former Patent No. 1,583,117, dated May 4, 1926.

The hub of the piston, in this instance the hub member 4, of the spider 3, is provided with a plurality of pivoted levers, disposed radially with respect to the axis of the piston, and each comprising an outwardly extending arm, 25, and an inwardly extending arm, 26, said arms extending in opposite directions from their point of pivoting, indicated at 27. Said arms are conveniently pivoted to ears, 28, secured to or forming part of the spider, 3. At the outer ends of the arms, 25, are provided plunger rods, 29, adjustably secured thereto by means of threaded portions, 29ª, engaging threaded apertures in the levers, 25, and provided with set nuts, 29ᵇ, as shown, each of said plunger rods having an enlarged substantially flat head, 30, of predetermined area, which normally engages the diaphragm member, centrally, with respect to the space enclosed between adjacent arms, or webs, 5—5. The arms, 26, of said levers are engaged by a collar, 31, on the valve actuating part, or sleeve, 20, so that pressure applied to the diaphragm member in rear of the piston (to the right in Fig. 2) shall be transmitted by all of said levers to the collar, 31, and sleeve, 20, in a direction tending to move said sleeve rearwardly or in a reverse direction to that indicated by the arrow in Fig. 2.

Referring to Fig. 1, the actuator is mounted on a stationary portion of the chassis, and the piston rod, 9, is connected by a link, 73, with brake mechanism of the vehicle, which may be of any desired type and may be applied to any desired number of wheels. In the diagram the brake mechanism, generally, is represented by a single brake mechanism, comprising the brake drum, 70, brake band, 71, and brake lever, 72, connected to the link rod, 73, and provided with retracting spring 74.

The valve actuating sleeve, 20, is connected by a link, 87, with an operator operated part, in this instance the usual pedal lever, 88, which is provided with a retracting spring, 89. This retracting spring need not be heavier than will be sufficient to counterbalance the weight of the pedal lever and prevent it from moving forward by its own weight, and the usual stiff retracting spring with which pedal levers are ordinarily provided may be omitted. The actuator is connected with the suction passage of the engine, in this instance by a pipe, 66, extending from an aperture in the forward end of the cylinder to the manifold, and connected to the latter between the throttle valve and the engine cylinders, in order to insure maximum suction or rarefication. The pipe, 66, is preferably provided with restricting valve, indicated at 67, and a check valve, indicated at 68, the restricting valve being adjusted so as to prevent such large quantities of air being admitted to the manifold at any one time from the actuator, as to interfere with the operation of the engine or stall it if idling, and the check valve is preferably employed in order to secure the greatest degree of rarefication within the cylinder of the actuator, which acts as a storage space, and preferably on both sides of the piston, between actuations of the brake mechanism. We prefer to have the piston submerged in vacuum when it is in its retracted position, and to this end the parts hereinbefore described are so adjusted that when the piston is in retracted position, as shown in Fig. 2, the suction valve, 40, will be held slightly opened as shown, thereby connecting the portions of the cylinder on opposite sides of the piston, and insuring the rarefication of the entire cylinder through the suction pipe, 66, when the piston is retracted.

We also prefer to provide means for connecting the foot lever with the piston having provision for lost motion, sufficient to insure the operation of the valve mechanism in order that the operator may move the piston forward, in the direction of the arrow, and apply the brake mechanism in case of failure of power, and also may add his physical force to that of the actuator when the power actuator is operated. In this instance we have shown the rear end of the sleeve, 20, provided with a collar, 32, adapted to engage a collar, 33, projecting inwardly from the piston rod, 10, when the valve sleeve is moved forward, beyond the necessary amount to operate the valve mechanism, thereby connecting the sleeve, 20, directly with the piston and the brake mechanism connected therewith.

Figure 2:
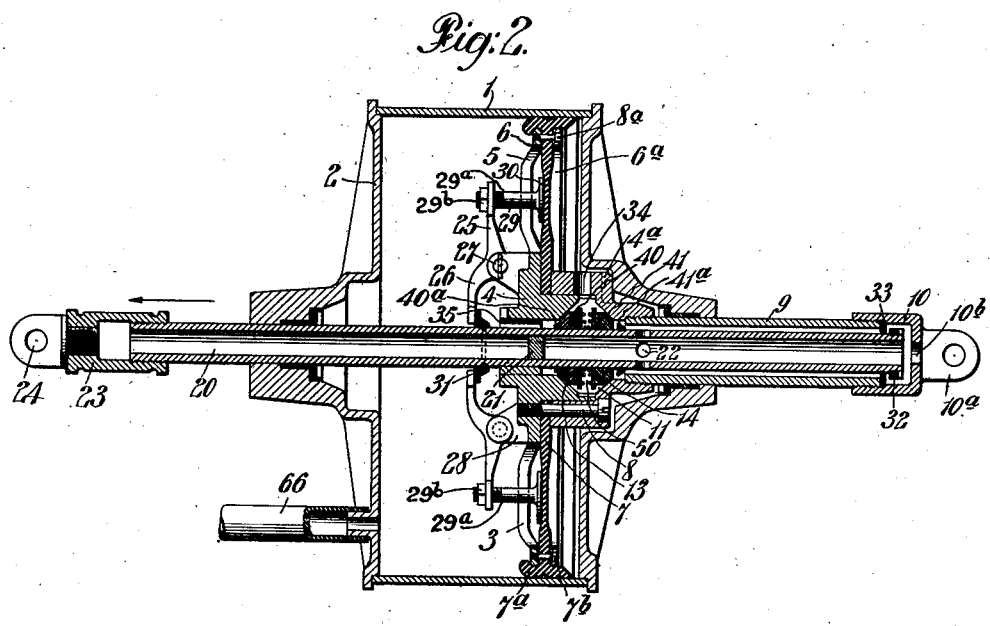
Fig. 2 is an enlarged sectional view of the power actuator shown in Fig. 1.
Figure 3:
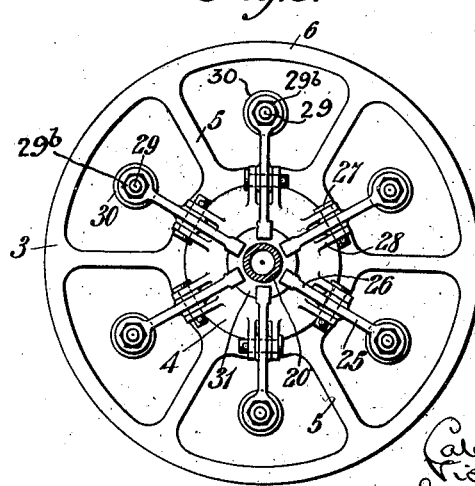
Fig. 3 is a plan view of the piston, showing the forward face thereof.

Assuming the parts to be in the position indicated in Figs. 1, 2 and 3, and the engine in operation, the air within the actuator cylinder 1, will be exhausted on both sides of the piston. When the operator desires to apply the brake mechanism, he will depress the foot lever, 88, thus shifting the valve sleeve, 20, in the direction of the arrow, Fig. 2, closing the suction valve, 40, and opening the air inlet valve, 41. This connects the rear end of the cylinder with the atmosphere, while the forward end remains at all times connected with the suction pipe, and the piston will move forward. As the pressure of the atmospheric air accumulates within the cylinder in rear of the piston, the portions of the diaphragm between the radial arms, 5, will be moved in the direction of the arrow, Fig. 2, with respect to the piston frame, in a direction parallel with the axis of the piston, exerting pressure on the studs, 29, which is transmitted by the levers, 25, to the collar, 31, on the valve actuating sleeve, 20, in the opposite direction, thereby transmitting a portion of the pressure exerted on the rear face of the piston to the foot of the operator through the pedal lever, and tending to move the valve sleeve in a direction opposite that indicated by the arrow in Fig. 2, which tendency is resisted by the pressure of the foot of the operator on the pedal. As long as the operator continues to push on the pedal with sufficient force to overcome this tendency to reverse the movement of the valve sleeve, the piston will continue to move forward, together with the valve sleeve, pedal lever, and the foot of the operator. As the load of the brakes increases and resists increasingly the forward movement of the piston, as the brakes are applied, more air must be admitted and the resistance to the foot of the operator will correspondingly increase, and he must exert, continually greater pressure in order to keep the piston moving forward until the brakes are fully applied. The resistance encountered by the opeartor's foot is gradually increased as the pressure on the piston increases and serves as a true index to the operator as to the force with which the brakes are being applied, and enables him to accurately judge and secure the desired frictional resistance and pressure of the brakes. The brakes will be actually applied, however, by the power of the piston, and only a certain proportion of the pressure accumulated in rear of the piston is applied to the operator's foot, which may be varied by adjusting the position of the heads of the studs, 29, with respect to their levers, 25.

As soon as the forward movement of the pedal lever stops, the piston will continue to move forward slightly, sufficiently to close the air inlet valve, 41, and thereby hold the brakes in applied position, so long as the operator maintains the necessary pressure on the pedal to prevent a rearward movement of the sleeve, 20.

When the brakes are fully applied by the actuator, a further forward movement of the foot lever will bring the collar, 32, on the valve sleeve, into engagement with the piston rod, 9, so that the operator may add his physical force to that of the actuator in applying the brake mechanism.

When the operator desires to partially release the brakes he will relieve, slightly, his pressure on the foot lever, which will immediately result in the shifting of the valve sleeve, 20, in a direction opposite that indicated by the arrow in Fig. 2, by the pressure in rear of the diaphragm through the levers, 25, causing the suction valve, 40, to be opened, thereby permitting the pressures in the cylinder on both sides of the piston to equalize and connecting both ends of the cylinder with the suction passage, 66. This permits the brakes to relieve themselves, and they can be immediately reapplied by pressing forward on the pedal lever to again close the suction valve and open the air inlet valve, and this operation may be repeated as often as necessary without admitting very large quantities of air to the suction passage through the pipe, 66. When it is desired to restore the brake mechanism and actuator to normal position, the operator will remove his foot from the pedal lever, permitting the levers, 25, to shift the valve sleeve rearwardly and open the air inlet valve, 40, producing an equalization of pressures within the cylinder on opposite sides of the piston, and allowing the piston to be retracted by the drag of the brake mechanism and its retracting springs. The resiliency of the diaphragm holds the valve sleeve in this position during the return movement of the piston, and permits the air introduced in rear of the piston to effect the application of the brakes, to be first transferred in part to the forward side of the piston, and gradually exhausted from the cylinder on both sides of the piston, and delivered into the intake manifold under the control of the restricting valve, 67, and leaving the piston submerged in vacuum and ready for another operation.

It will be seen that by our invention the operator is able to feel the application of power by the actuator to the brake mechanism, in a manner to which he is accustomed in the application of ordinary brake mechanism, without, however, having to directly apply more than a predetermined proportion of such power to the pedal lever, and the pressure of his foot on the pedal lever will increase directly in proportion to the pressure actually exerted by the actuator piston on the brake mechanism. Where valve mechanism for a power actuator is operated by ordinary valve mechanism under the control of a foot lever provided with the usual retracting spring, a curve showing the work done by the operator's foot on such a pedal lever would show almost a straight line until the piston exerted its maximum power, when it would rise proportionately to the amount of the added physical effort exerted by the driver in applying his own power to the brake mechanism, in addition to that of the actuator. In accordance with our invention, a curve representative of the pressure exerted by the operator's foot on the brake lever would show a gradual and even rise, as the resistance to the operator's foot builds up proportionately with the pressure exerted on the piston and transmitted to the brakes. It will also be seen that according to our invention, the reversing of the valve mechanism and return of the piston to neutral position will be accomplished positively by the diaphragm portions, of the piston, and the mechanism connecting them with the valve actuating sleeve, so that the use of the ordinary retracting spring for retracting the foot lever and operating the valve mechanism in the reverse direction is unnecessary, and it is only necessary to employ a spring of sufficient power to counterbalance the weight of the brake pedal.

In Figs. 4 and 5 of the drawings, we have shown a slightly modified form of our invention in which the piston of the actuator is provided with a plurality of small pistons, movable with respect thereto, arranged in a circular series and having their axes parallel with the axis of the piston and arranged to operate the radially disposed levers, in the same manner as the portions of the diaphragm member previously described. In these figures, the corresponding parts are represented by the same reference characters, with the addition of 100. Thus, the cylinder, 101, is provided with heads, 102, and piston 103, in this instance provided with a gasket $103^a$, having flanges, $103^b$ and $103^c$, for engaging the cylinder. The piston is provided with a plurality of cylindrical apertures, $103^d$, in each of which is located a piston, 107, having its axis parallel to the axis of the piston and provided with a piston ring or other means for fitting it tightly in the cylindrical aperture, $103^d$, which it occupies. The hub, 104, of the piston is provided with the valve chamber, 111, connected with the cylinder on opposite sides of the piston by the port, or ports, 134 and 135, and provided with the suction valve 140, and air inlet valve, 141, carried by the sleeve 120, all constructed and operating in the manner hereinbefore described. The piston is provided with ears, 128, to which are pivoted the radial levers, the outer ends of the arms, 125, of which engage axially the pistons 107 while the arms, 126, of said levers engage the collar, 131 on the valve actuating sleeve, 120. It will be understood that the actuator shown in Figs. 4 and 5 is connected with the intake manifold by pipe, 166, and with the foot lever and brake mechanism, exactly as shown in Fig. 1 and that the parts shown in Figs. 4 and 5 and not specifically described are identical with the corresponding parts shown in Figs. 2 and 3, and operate in the same manner.

The cylindrical apertures, 103$^d$ and the pistons, 107, will be of a predetermined diameter, so that their combined areas will bear a proportion to the total area of the piston corresponding to the proportion of the pressure exerted by the piston on the brake mechanism which it is desired to have borne by the foot of the operator. This proportion is of course fixed and cannot be varied whereas in the construction previously described, the proportion of the pressure exerted on the piston, which is transmitted to the foot of the operator can be varied by adjusting the plunger rods, 29 (Figs. 2 and 3) with respect to the lever arms, 25.

In the operation of the brake mechanism connected with the actuator illustrated in Figs. 4 and 5, when the operator applies his foot to the pedal, the valve actuating sleeve, 120, will be moved in the direction of the arrow in Fig. 4 closing the suction valve, 140, and opening the air inlet valve, 141, to admit atmospheric air to the cylinder in rear of the piston. As the pressure accumulates in rear of the piston 103, a certain proportion of the pressure will be transmitted by the lever arms, 125, 126, to the collar, 131, sleeve, 120, and thence to the pedal, resisting the forward movement of the pedal and transmitting a proportion of the pressure applied to the piston to the foot of the operator, which pressure will gradually increase as the brakes are applied to the desired extent. The operator may release and re-apply the brakes, as before described, and as soon as he takes his foot from the brake pedal, the pressure on the small pistons, 107, will thrust the valve sleeve, 120, in a reverse direction from that indicated by the arrow in Fig. 4, closing the air valve and opening the suction valve, permitting an equalization of pressures within the cylinders on opposite sides of the piston, and permitting the brakes to release themselves and retract the piston under the drag of the brakes and the retracting spring or springs therefor, the parts coming to rest in the position indicated in Fig. 4, to which the suction valve is partially opened so that the air previously admitted to effect the working stroke of the piston, a portion of which is transferred to the forward side of the cylinder when the suction valve, 140, was opened, will be exhausted from the cylinder on both sides of the piston, leaving the piston submerged in vacuum and ready for a further operation. The proportionate amount of pressure exerted upon the piston in applying the brake mechanism, which is to be transferred to the foot of the operator, can be varied, in this form of our invention, by varying the areas of the cylindrical apertures, 103$^d$, and the small pistons, 107, with which the actuator piston is provided.

As indicated in Fig. 4, we prefer to so construct the small pistons, 107, that on the return movement of the main piston to normal position, the small pistons, 107, or parts connected therewith, will engage a stationary part of the cylinder of the actuator, as the head, 102, before the main piston comes to rest against the cylinder head. This effects a slight movement of the small pistons, 107, with respect to the main piston in the direction of the arrow in Fig. 4, and through the levers, 125, 126, shifts the valve sleeve 120, in the opposite direction, and slightly opens the suction valve, 104, as the main piston comes to rest, as clearly shown in Fig. 4. The opening of the suction valve places the cylinder on both sides of the piston in communication with the source of suction, in this instance the suction pipe, 166, leading to the manifold, and thus maintains the piston submerged in vacuum.

We may also provide means for relative adjustment between the fluid pressure operated movable parts of the piston and the valve actuating sleeve, in the direction illustrated in Fig. 4. This may be accomplished, for example, by providing the ends of the levers adjacent to the collar, 131, with set screws, 132, for engaging the collar, 131, which is shown rigidly secured to the valve actuating sleeve, 120. It is to be understood, however, that the same adjustment could be obtained either in this form of the invention or in the form illustrated in Figs. 2 and 3, for example, by adjusting the collar longitudinally of the valve actuating sleeve. We have shown such a construction in Fig. 6, which is applicable to either form of the invention. In this instance the valve actuating sleeve, indicated at 120$^a$, is provided with an exteriorly threaded collar, 131$^b$, secured to the sleeve as by pin, 131$^c$, and the collar, 131$^a$, which engages the inwardly extending arms, 126$^a$, of the levers, is internally screw threaded to engage the collar, 131$^b$, upon which it can be adjusted longitudinally of the sleeve and secured in adjusted position, as by a set screw, 131$^d$.

It will be understood that in the form of our invention shown in Figs. 4 and 5, the operator can also add his physical force to the force exerted by the actuator in applying the brakes. It will be further understood that in both forms of the invention, should the power fail for any reason, the operator can, by depressing the foot pedal sufficiently to take up the lost motion provided between the valve actuating sleeve and the piston, move the piston of the actuator and apply the brake mechanism connected therewith by his physical force alone. In such case the first movement of the valve sleeve will operate the valve mechanism so as to vent the cylinder, so that the only resistance offered by the actuator would be the frictional resistance of the piston and cylinder.

It is, therefore, to be understood that in the form of our invention illustrated in Figs. 4 and 5, for example, the piston and valve actuating sleeve will be provided with means for limiting the relative movement or lost motion between them, which may be the means illustrated for this purpose in Fig. 2, for example, and there shown as comprising the collar, 32, on the valve actuating sleeve located between a collar, 33, on the hollow piston rod and the rear end of the recess in the fitting, 10. It has not been deemed necessary to repeat the illustration of these parts in Fig. 4. It will be understood that the limitation of the movement between the valve actuating sleeve connected with the operator operated part and the piston of the actuator not only accomplished the results mentioned in the preceding paragraph, but serves to prevent injury to the valve mechanism, and in the diaphragm type illustrated in Figs. 2 and 3, it also prevents damage to the diaphragm, which might otherwise result.

What we claim and desire to secure by Letters Patent is:—

1. In a power actuator, the combination with a cylinder, a piston movable therein, means for connecting the piston with a part to be actuated, means for establishing differential pressures on opposite faces of the piston, including controlling valve mechanism, an operator operated part, connections between said part and the valve mechanism, including a valve actuating part, said piston being provided with fluid pressure actuated portions movable with respect to the piston and having their opposite faces exposed to the pressures in the cylinder on opposite faces of the piston, and operative connections between said fluid pressure operated portions of the piston, and a part connected with the operator operated part, for transmitting a portion of the pressure exerted on the piston by the higher pressure fluid to the operator through said operator operated part in a direction to resist the operative movement thereof, which effects a power stroke of the actuator piston.

2. In a power actuator, the combination with a cylinder, a piston movable therein, means for connecting the piston with a part to be actuated, means for establishing differential pressures on opposite faces of the piston, including controlling valve mechanism, an operator operated part, connections between said part and the valve mechanism, including a valve actuating part, said piston being provided with fluid pressure actuated portions movable with respect to the piston and having their opposite faces exposed to the pressure in the cylinder on opposite faces of the piston, and operative connections between said fluid pressure operated portions of the piston, and said valve actuating part, constructed to effect a movement thereof in a direction to hold said controlling valve mechanism in and return it to normal position, said connections also transmitting a portion of the pressure exerted on the piston by the higher pressure fluid to the operator through said operator operated part, to resist the operative movement thereof to effect a power stroke of the actuator.

3. In a power actuator, the combination with a cylinder, a piston movable therein, means for connecting the piston with a part to be actuated, means for establishing differential pressures on opposite faces of the piston, including controlling valve mechanism, an operator operated part, connections between said part and the valve mechanism, including a valve actuating part, said piston being provided with fluid pressure actuated portions movable with respect to the piston and having their opposite faces exposed to the pressure in the cylinder on opposite faces of the piston, and operative connections between said fluid pressure operated portions of the piston, and a part connected with the operator operated part and with said controlling valve mechanism, and normally holding said valve mechanism in position to establish an equalization of pressures on opposite sides of the piston, said fluid pressure actuated portions and said connections serving to transmit a portion of the pressure exerted on the piston by the higher pressure fluid to effect a power stroke of the actuator piston to the operator through said operator operated part, to resist the operative movement thereof.

4. In a power actuator, the combination with a cylinder, a piston movable therein, controlling valve mechanism, means for connecting the cylinder with the source of suction, and with the atmosphere under the control of said valve mechanism, to establish differential pressures on opposite faces of the piston, an operator operated part, connections between said part and the valve mechanism, including a valve actuating part, said piston being provided with fluid pressure actuated portions movable with respect to the piston, and having their opposite faces exposed to the pressures in the cylinder on opposite faces of the piston, and operative connections between said fluid pressure operated portions of the piston and said valve actuating part, constructed to normally hold said valve mechanism in position to connect the portions of the cylinder on both faces of the piston with the source of suction, and serving to transmit a portion of the pressure exerted on the piston when atmospheric air is admitted to one end of the cylinder by a movement of said valve mechanism during a power stroke of said piston, to the operator through said operator operated part, to resist the operative movement thereof, and means for connecting the piston with a part to be actuated.

5. In a power actuator, the combination with a cylinder, a piston movable therein, means for connecting the piston with a part to be actuated, means for establishing differential pressures on opposite faces of the piston, including controlling valve mechanism, located in said piston, a valve actuating part extending outside of said cylinder, an operator operated part connected therewith, said piston being provided with fluid pressure actuated portions movable with respect to the piston and having their opposite faces exposed to pressures in the cylinder on opposite faces of the piston, and operative connections between said fluid pressure operated portions of the piston and said valve actuating part normally holding said valve mechanism in position to effect equalization of pressures on opposite faces of the piston and serving to transmit a portion of the pressure exerted on the piston by the higher perssure fluid during a power stroke of the piston to the operator through said operator operated part.

6. In a power actuator, the combination with a cylinder, a piston movable therein, means for connecting the piston with a part to be actuated, means for establishing differential pressures on opposite faces of the piston including controlling valve mechanism, an operator operated part, connections between said part and the valve mechanism, including a valve actuating part, said piston being provided with fluid pressure actuated portions movable with respect to the piston and having their opposite faces exposed to the pressures in the cylinder on opposite faces of the piston, and operative connections between said fluid pressure operated portions of the piston and a part connected with the operator operated part for transmitting a predetermined proportion of the pressure exerted on the piston by the higher pressure fluid to the operator through said operator operated part, said connections being provided with adjustable means for varying the relative proportion of the said pressure transmitted to the operator operated part.

7. In a power actuator, the combination with a cylinder, a piston movable therein, means for connecting the piston with a part to be actuated, means for establishing differential pressures on opposite faces of the piston including controlling valve mechanism, and means for connecting said valve mechanism with sources of lower and higher pressures, an operator operated part, and operative connections between said part and the valve mechanism, said piston being provided with apertures therein, fluid pressure actuated portions for closing said apertures and exposed to the pressures in the cylinder on opposite faces of the piston, levers pivoted to said piston on one face thereof, and provided at their outer end with parts for engaging said movable pressure actuated portions of the piston, the inner ends of said levers engaging a part operatively connected with the operator operated part for transmitting a portion of the pressure exerted on the opposite face of the piston, by the higher pressure fluid to the operator operated part.

8. In a power actuator, the combination with a cylinder, a piston movable therein, means for connecting the piston with a part to be actuated, means for establishing differential pressures on opposite faces of the piston including controlling valve mechanism, and means for connecting said valve mechanism with sources of lower and higher pressures, an operator operated part, and operative connections between said part and the valve mechanism, said piston being provided with apertures therein, fluid pressure actuated portions for closing said apertures and exposed to the pressures in the cylinder on opposite faces of the piston, levers pivoted to said piston on one face thereof, and provided at their outer end with parts for engaging said movable pressure actuated portions of the piston, the inner ends of said levers engaging a part operatively connected with the operator operated part for transmitting a portion of the pressure exerted on the opposite face of the piston, by the higher pressure fluid to the operator operated part, and means for adjusting the parts engaging said fluid pressure actuated portions of the piston, with respect to each other and the part connected with the operator operated part.

9. In a power actuator, the combination with a cylinder, a piston movable therein, means for connecting the piston with a part to be actuated, means for establishing differential pressures on opposite faces of the piston including controlling valve mechanism, and means for connecting said valve mechanism with sources of lower and higher pressures, an operator operated part, and operative connections between said part and the valve mechanism, said piston being provided with apertures therein, flexible diaphragm portions closing said apertures and operative connections between said flexible diaphragm portions of the piston and the operator operated part for transmitting a portion of the pressure exerted on the piston by the higher pressure fluid during a power stroke of the piston to the operator operated part.

10. In a power actuator, the combination with a cylinder, a piston movable therein, means for connecting the piston with a part to be actuated, means for establishing differential pressures on opposite faces of the piston, including controlling valve mechanism, and means for connecting said valve mechanism with sources of lower and higher pressures, an operator operated part, and operative connections between said part and the valve mechanism, said piston being provided with apertures therein, and a flexible diaphragm having portions extending over said apertures, and operative connections on one side of the piston, having parts engaging the portions of the diaphragm extending over said apertures, and parts engaging a part connected with the operator operated part for transmitting a portion of the pressure of the higher pressure fluid on the opposite face of said piston and diaphragm to the operator operated part.

11. In a power actuator, the combination with a cylinder, a piston movable therein, means for connecting the piston with a part to be actuated, means for establishing differential pressures on the opposite faces of the piston including controlling valve mechanism, and means for connecting said valve mechanism with sources of lower and higher pressures, an operator operated part, and operative connections between said part and the valve mechanism, said piston being provided with clamping portions adjacent to the axis of the piston, and adjacent to the periphery of the piston, and having apertures located between said clamping portions, a flexible diaphragm extending across said apertures and being secured between said clamping portions of the piston, levers pivotally mounted on said piston and provided with portions engaging portions of the diaphragm extending across said apertures, said levers being provided with portions for engaging a part connected with the operator operated part for transmitting a portion of the pressure exerted on the opposite face of the diaphragm and piston by higher pressure fluid to effect a power stroke of the piston, to the operator operated part, in a direction to resist the movement thereof.

12. In a power actuator, the combination with a cylinder, a piston movable therein, means for connecting the piston with a part to be actuated, means for establishing differential pressures on the opposite faces of the piston including controlling valve mechanism, and means for connecting said valve mechanism with sources of lower and higher pressures, an operator operated part, and operative connections between said part and the valve mechanism, said piston having clamping members adjacent to its axis and adjacent to its peripheral portions, and apertures located between said clamping portions, a flexible diaphragm located between said clamping portions of the piston and closing said apertures, means for securing said clamping members upon the diaphragm, levers pivotally mounted on said piston, having a plunger adjustably connected therewith and engaging a portion of the diaphragm extending over an aperture in the piston, and an arm engaging a part connected with the operator operated part for transmitting a portion of the pressure of the higher pressure fluid on the opposite side of the piston to effect a power stroke thereof, to the operator operated part, in a direction to resist the operative movement thereof.

13. In a power actuator, the combination with a cylinder, a piston movable therein, means for connecting the piston with a part to be actuated, means for establishing differential pressures on the opposite faces of the piston including controlling valve mechanism, and means for connecting said valve mechanism with sources of lower and higher pressures, an operator operated part, and operative connections between said part and the valve mechanism, said piston being provided with clamping members adjacent to the axis of the piston, and separate clamping members adjacent to the periphery of the piston and having apertures located between said clamping members, a flexible diaphragm interposed between said clamping members, and means for securing said clamping members of the piston upon the diaphragm, levers pivotally mounted on said piston and provided with portions engaging portions of the diaphragm extending across said apertures, said levers being provided with portions for engaging a part connected with the operator operated part for transmitting a portion of the pressure exerted on the opposite face of the diaphragm and piston by higher pressure fluid to effect a power stroke of the piston, to the operator operated part, in a direction to resist the movement thereof, said diaphragm being provided with lateral flanges between the peripheral portions of the piston and the interior of the cylinder.

14. In a power actuator, the combination with a cylinder closed at both ends, a piston in said cylinder provided with a piston rod extending through one end of the cylinder and provided with means for connecting it with a part to be actuated, controlling valve mechanism for the actuator located in the hub of the piston, means for connecting said valve mechanism with a source of suction and with the atmosphere, a longitudinally movable valve actuating part extending through one end of the cylinder and operatively connected with said valve mechanism, an operator operated part connected with said valve actuating part, said piston being provided with a plurality of apertures, and fluid pressure operated parts movable with respect to the piston for closing said apertures, levers pivoted to the piston on one face thereof and provided with means for engaging said fluid pressure operated parts of the piston, and means for engaging said valve actuating part for normally holding the valve mechanism in, and returning it to, normal position, and for transmitting a portion of the pressure exerted on the other face of the piston by the higher pressure fluid during a power stroke of the piston to the operator operated part in a direction to resist the movement thereof.

15. In brake mechanism for an automotive vehicle, provided with an internal combustion engine having a suction passage, and brake mechanism for the vehicle, the combination of a power actuator comprising a cylinder, a piston therein, operatively connected with the brake mechanism, controlling valve mechanism for the actuator, means for connecting the actuator with the suction passage of the engine, and with the atmosphere, an operator operated part, a valve actuating part connecting it with the valve mechanism, said piston being provided with a fluid pressure operated part movable with respect to the piston, operative connections between said movable parts of the piston and a part connected with the operator operated device for transmitting a portion of the pressure exerted by the atmosphere on the piston in a direction to apply the brake mechanism, to the operator operated part in a direction to resist the movement thereof by the operator in a direction to apply the brakes.

16. In brake mechanism for an automotive vehicle, provided with an internal combustion engine having a suction passage, and brake mechanism for the vehicle, the combination of a power actuator comprising a cylinder, a piston therein, operatively connected with the brake mechanism, controlling valve mechanism for the actuator, means for connecting the actuator with the suction passage of the engine and with the atmosphere, an operator operated part, a valve actuating part connecting it with the valve mechanism, said piston being provided with a fluid pressure operated part movable with respect to the piston, operative connections between said movable parts of the piston and the valve actuating part normally holding said valve mechanism in position to connect the cylinder on both sides of the piston with the suction passage of the engine and effective to transmit a portion of the pressure exerted on the piston during a power stroke to apply the brake mechanism, to the operator operated part in a direction to release the brakes.

17. In brake mechanism for an automotive vehicle, provided with an internal combustion engine for propelling the vehicle, having a suction passage, and brake mechanism for the vehicle, the combination of a power actuator comprising a cylinder, a piston therein, operatively connected with the brake mechanism, said piston being provided with apertures, and fluid pressure operated parts movable with respect to the piston closing said aperture, controlling valve mechanism for the actuator located in the hub of the piston and constructed to connect portions of the cylinder on opposite sides of the piston with each other, and to connect the portion of the cylinder in rear of the piston, to the atmosphere, a suction pipe for connecting the cylinder forward of the piston with the suction passage of the engine, a valve actuating part connected with the valve mechanism and extending through one end of the cylinder, an operator operated part connected with the valve actuating part, and operative connections between the relatively movable portions of the piston and the valve actuating part normally holding the valve mechanism in position to connect the portions of the cylinder on opposite sides of the piston and to disconnect the atmosphere therefrom, said connections being effective to transmit a portion of the pressure of the atmosphere on the piston during a power stroke to apply the brake mechanism to the operator operated part in a direction to resist the further movement thereof.

18. In a power actuator, the combination with a cylinder, a piston movable therein, means for connecting the piston with a part to be actuated, means for establishing differential pressures on opposite faces of the piston, including controlling valve mechanism, an operator operated part, connections between said part and the valve mechanism, including a valve actuating part, said piston being provided with fluid pressure actuated portions movable with respect to the piston and having their opposite faces exposed to the pressure in the cylinder on opposite faces of the piston, and operative connections between said fluid pressure operated portions of the piston, and a part connected with the operator operated part and with said controlling valve mechanism, and constructed to hold said valve mechanism in position to establish equalization of pressures on opposite sides of the piston, and connect the cylinder on both sides of the piston with one of the differential pressure sources when the piston is in retracted position, said fluid pressure actuated portions and said connections serving to transmit a portion of the pressure exerted on the piston to effect a power stroke thereof, to the operator through said operator operated part to resist the operative movement thereof.

19. In a power actuator, the combination with a cylinder, a piston movable therein, controlling valve mechanism, means for connecting the cylinder with the source of suction, and with the atmosphere under the control of said valve mechanism, to establish differential pressures on opposite faces of the piston, an operator operated part, connections between said part and the valve mechanism, including a valve actuating part, said piston being provided with fluid pressure actuated portions movable with respect to the piston, and having their opposite faces exposed to the pressure in the cylinder on opposite faces of the piston, and operative connections between said fluid pressure operated portions of the piston and said valve actuating part, constructed to normally hold said valve mechanism in position to connect the portions of the cylinder on both faces of the piston with each other, and serving to transmit a portion of the pressure exerted on the piston to effect a power stroke thereof, to the operator, through said operator operated part, to resist the operative movement thereof, and means for connecting the piston with a part to be actuated.

20. In a power actuator, the combination with a cylinder, a piston movable therein, controlling valve mechanism, means for connecting the cylinder with the source of suction, and with the atmosphere under the control of said valve mechanism, to establish differential pressures on opposite faces of the piston, an operator operated part, connections between said part and the valve mechanism, including a valve actuating part, said piston being provided with fluid pressure actuated portions movable with respect to the piston, and having their opposite faces exposed to the pressures in the cylinder on opposite faces of the piston and operative connections between said fluid pressure operated portions of the piston and said valve actuating part, constructed to normally hold said valve mechanism in position to connect the portions of the cylinder on both faces of the piston with each other and with one of said differential pressure sources, and serving to transmit a portion of the pressure exerted on the piston, to effect a power stroke thereof to the operator, through said operator operated part to resist the operative movement thereof, and means for connecting the piston with a part to be actuated.

21. In a power actuator, the combination with a cylinder, a piston movable therein, means for connecting the piston with a part to be actuated, means for establishing differential pressures on opposite faces of the piston including controlling valve mechanism, and means for connecting said valve mechanism with sources of lower and higher pressures, an operator operated part, and operative connections between said part and the valve mechanism, said piston being provided with apertures therein, flexible diaphragm portions closing said apertures, and operative connections between said flexible diaphragm portions of the piston and the operator operated part for transmitting a portion of the pressure exerted on the piston by the higher pressure fluid during a power stroke of the piston, to the operator operated part, said operator operated part being movable relatively with respect to the piston, and means for limiting the relative movement between the operator operated part and the piston whereby injury to the diaphragm is prevented.

22. In a power actuator, the combination with a cylinder, a piston movable therein, means for connecting the piston with a part to be actuated, means for establishing differential pressures on opposite faces of the piston, including controlling valve mechanism, an operator operated part, connections between said part and the valve mechanism, including a valve actuating part, said piston being provided with fluid pressure actuated portions movable with respect to the piston and having their opposite faces exposed to the pressure in the cylinder on opposite faces of the piston, and operative connections between said fluid pressure operated portions of the piston, and a part connected with the operator operated part and with said controlling valve mechanism, said fluid pressure actuated portions and its connections serving to transmit a portion of the pressure exerted on the piston by the higher pressure fluid to effect a power stroke of the actuator piston to the operator, through said operator operated part, to resist the operative movement thereof, and operative connections between the operator operated part and the piston containing a provision for limited lost motion sufficient to effect the operation of the valve mechanism, to permit the operator to exert his physical strength directly upon the piston and part to be actuated thereby, in addition to the power of the actuator, or upon failure of power.

23. In a power actuator, the combination with a cylinder, a piston movable therein, means for connecting the piston with a part to be actuated, means for establishing differential pressures on opposite faces of the piston including controlling valve mechanism, and means for connecting said valve mechanism with sources of lower and higher pressures, an operator operated part, and operative connections between said part and the valve mechanism, said piston being povided with apertures therein, flexible diaphragm portions closing said apertures, and operative connections between said flexible diaphragm portions of the piston and the operator operated part for transmitting a portion of the pressure exerted on the piston by the higher pressure fluid during a power stroke of the piston to the operator operated part, said operator operated part being movable with respect to the piston, and means for limiting the relative movement of the operator operated part with respect to the piston, to protect the diaphragm portions from injury and to enable the operator by taking up the lost motion so provided, to apply his physical force directly to the piston in addition to that of the actuator, or upon failure of power.

In testimony whereof we affix our signatures.

CALEB S. BRAGG.
VICTOR W. KLIESRATH.